US008761963B2

(12) United States Patent
Hinkel, III

(10) Patent No.: US 8,761,963 B2
(45) Date of Patent: Jun. 24, 2014

(54) WHEELCHAIR GUIDING

(76) Inventor: John Hinkel, III, Hopkinton, MA (US)

( * ) Notice: Subject to any disclaimer, the term of this patent is extended or adjusted under 35 U.S.C. 154(b) by 527 days.

(21) Appl. No.: 12/957,563

(22) Filed: Dec. 1, 2010

(65) Prior Publication Data
US 2012/0143400 A1 Jun. 7, 2012

(51) Int. Cl.
*G05D 1/00* (2006.01)
*G06F 3/01* (2006.01)
(52) U.S. Cl.
CPC ............... *G06F 3/012* (2013.01); *G06F 3/017* (2013.01)
USPC .................. 701/2; 701/49; 188/24.19; 297/19
(58) Field of Classification Search
CPC ............ B62D 1/00; G06F 3/017; G06F 3/012
USPC ................... 701/2, 36, 49; 188/20, 22, 24.19; 297/19
See application file for complete search history.

(56) References Cited

U.S. PATENT DOCUMENTS

| | | | | |
|---|---|---|---|---|
| 3,993,154 A | * | 11/1976 | Simmons et al. | 180/316 |
| 4,767,940 A | * | 8/1988 | Tuttle | 307/116 |
| 5,047,953 A | * | 9/1991 | Smallwood et al. | 704/271 |
| 2003/0127261 A1 | * | 7/2003 | Borroni-Bird et al. | 180/65.1 |
| 2006/0227030 A1 | * | 10/2006 | Clifford et al. | 341/176 |

OTHER PUBLICATIONS

Hall, "Wii-powered robot chair is for toddlers, piloted by toddlers". http://dvice.com/archives/2010/11/wii-powered-rob.php; dated Nov. 19, 2010; accessed Dec. 1, 2010.

* cited by examiner

*Primary Examiner* — Gertrude Arthur Jeanglaude
(74) *Attorney, Agent, or Firm* — Fish & Richardson P.C.; Frank L. Gerratana

(57) ABSTRACT

Among other things, an apparatus includes a wheelchair control device sensitive to motion and adapted to attach to a user's head, and includes a wheelchair interface device in communication with the wheelchair control device and adapted to manipulate a control system of a motorized wheelchair in response to communication from the wheelchair control device. Among other things, a method includes causing a motorized wheelchair to change velocity in response to changing a position of a head-mounted wheelchair control device.

20 Claims, 8 Drawing Sheets

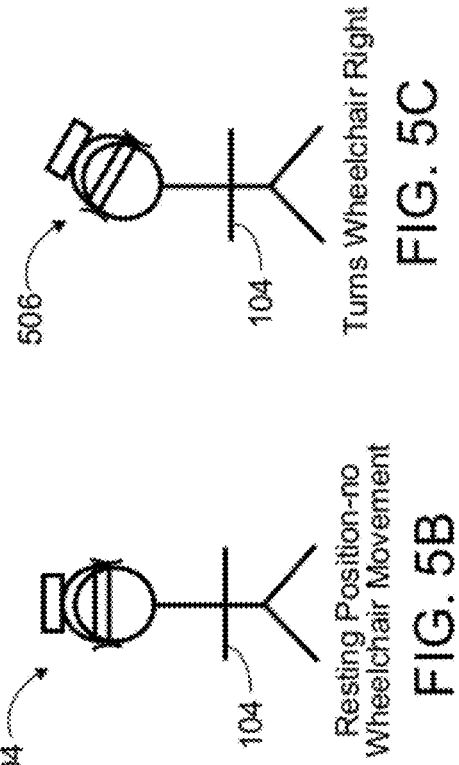
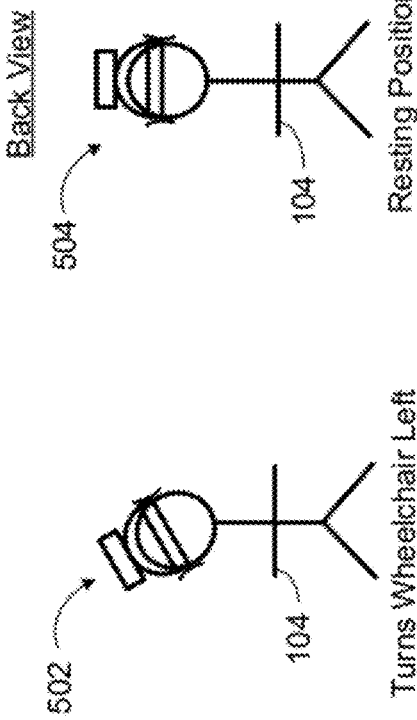
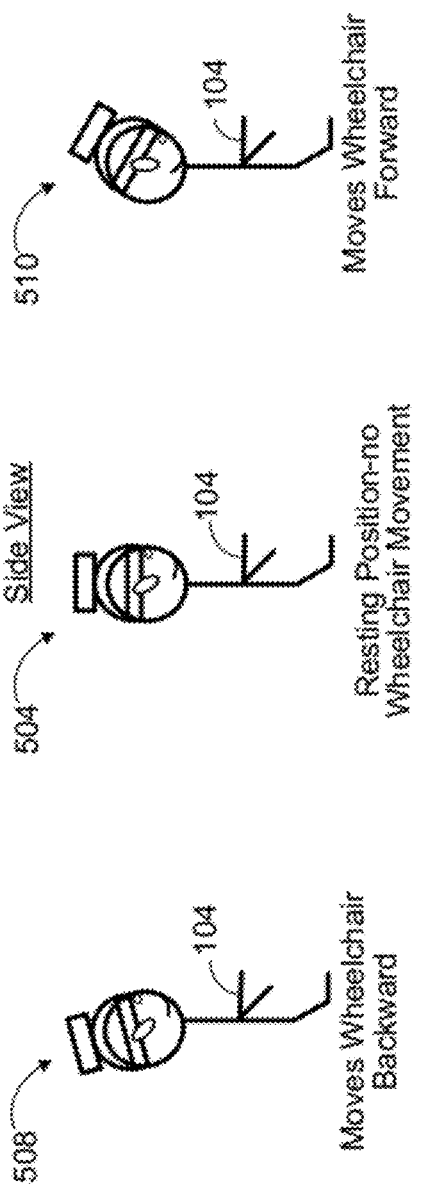

WHEELCHAIR GUIDING

BACKGROUND

This description relates to wheelchair guiding.

Individuals who have limited or no use of their legs can use a motorized wheelchair for mobility. Some of these individuals (for example, paraplegics) have the use of their arms and can control a wheelchair using traditional hand controls, such as buttons or joysticks. Other individuals (for example, quadriplegics, amputees, some stroke victims, or individuals affected by cerebral palsy, Parkinson's disease, or severe arthritis) may not be able to use their arms and only have the use of the body above the neck, for example. Thus, instead of hand controls, some wheelchairs have controls customized to the needs of quadriplegics. For example, some wheelchairs use controls that respond to sipping and puffing and some use controls that respond to tongue movements.

SUMMARY

In a general aspect, an apparatus comprises a wheelchair control device sensitive to motion and adapted to attach to a user's head, and a wheelchair interface device in communication with the wheelchair control device and adapted to manipulate a control system of a motorized wheelchair in response to communication from the wheelchair control device.

Implementations of this aspect may include the following features. The control system of the motorized wheelchair may include a hand control. The hand control may include a joystick. The wheelchair control device may include at least one configuration option customizable for an individual user of the wheelchair control device. The configuration option may include calibration of sensitivity to motion of the wheelchair control device according to movement patterns. The apparatus may include a configuration user interface for configuring the at least one configuration option, wherein the configuration user interface is in communication with at least one of the wheelchair control device and the wheelchair interface device. The apparatus may include a microprocessor configured to process movement signals of the wheelchair control device and communicate movement signals to the wheelchair interface device. The wheelchair interface device may be capable of attachment to and detachment from to the motorized wheelchair. The wheelchair interface device may be in wireless communication with the wheelchair control device. The wheelchair control device may include an accelerometer. The wheelchair interface device may include at least one sliding plate and at least one servomechanism.

In another general aspect, a method includes causing a motorized wheelchair to change velocity in response to changing a position of a head-mounted wheelchair control device.

Implementations of this aspect may include the following features. Causing a motorized wheelchair to change velocity may include causing the motorized wheelchair to change direction. Causing a motorized wheelchair to change velocity may include causing the motorized wheelchair to change speed. Changing the position of the head-mounted wheelchair control device may include a head nodding action. Changing the position of a head-mounted wheelchair control device may include moving a user's head to a position outside a range of motion, and causing the motorized wheelchair to change velocity may include stopping the wheelchair. Causing the motorized wheelchair to change velocity may include at least one of causing the motorized wheelchair to move forward, causing the motorized wheelchair to move backwards, causing the motorized wheelchair to turn left, causing the motorized wheelchair to turn right, and causing the motorized wheelchair to turn diagonally. Causing a motorized wheelchair to change velocity may include manipulating a control system of the motorized wheelchair. The method may include causing the motorized wheelchair to activate in response to changing a position of the head-mounted wheelchair control device. The method may include causing the motorized wheelchair to deactivate in response to a period of inactivity of the head-mounted wheelchair control device.

Aspects can include one or more of the following advantages. The wheelchair control device can be customized to an individual. The wheelchair control device can be used with standardized commercial wheelchairs that implement hand controls.

Other features and advantages will become apparent from the following description, and from the claims.

DESCRIPTION OF DRAWINGS

FIGS. 5A-5F are diagrams of head movements for controlling a head-guided wheelchair.

DESCRIPTION

The mobility of a quadriplegic individual who relies on a motorized wheelchair can be enhanced if he or she can use head movements to guide the wheelchair. The head is often the only portion of the body that such an individual retains control over, and so head movements can substitute for other types of motions (e.g. hand or arm movements). The disabled individual can attach a motion-sensing device to his head, and the motion-sensing device can translate head movements into control signals for a motorized wheelchair. The control signals cause the motorized wheelchair to change velocity (e.g. speed and/or direction). Further, because many motorized wheelchairs are in production, the motion-sensing device can communicate these control signals to an adapter that interfaces with a standardized control device (e.g. a joystick) on the motorized wheelchair. The motion-sensing device can then be used with any motorized wheelchair that uses standard controls.

Figure 1:
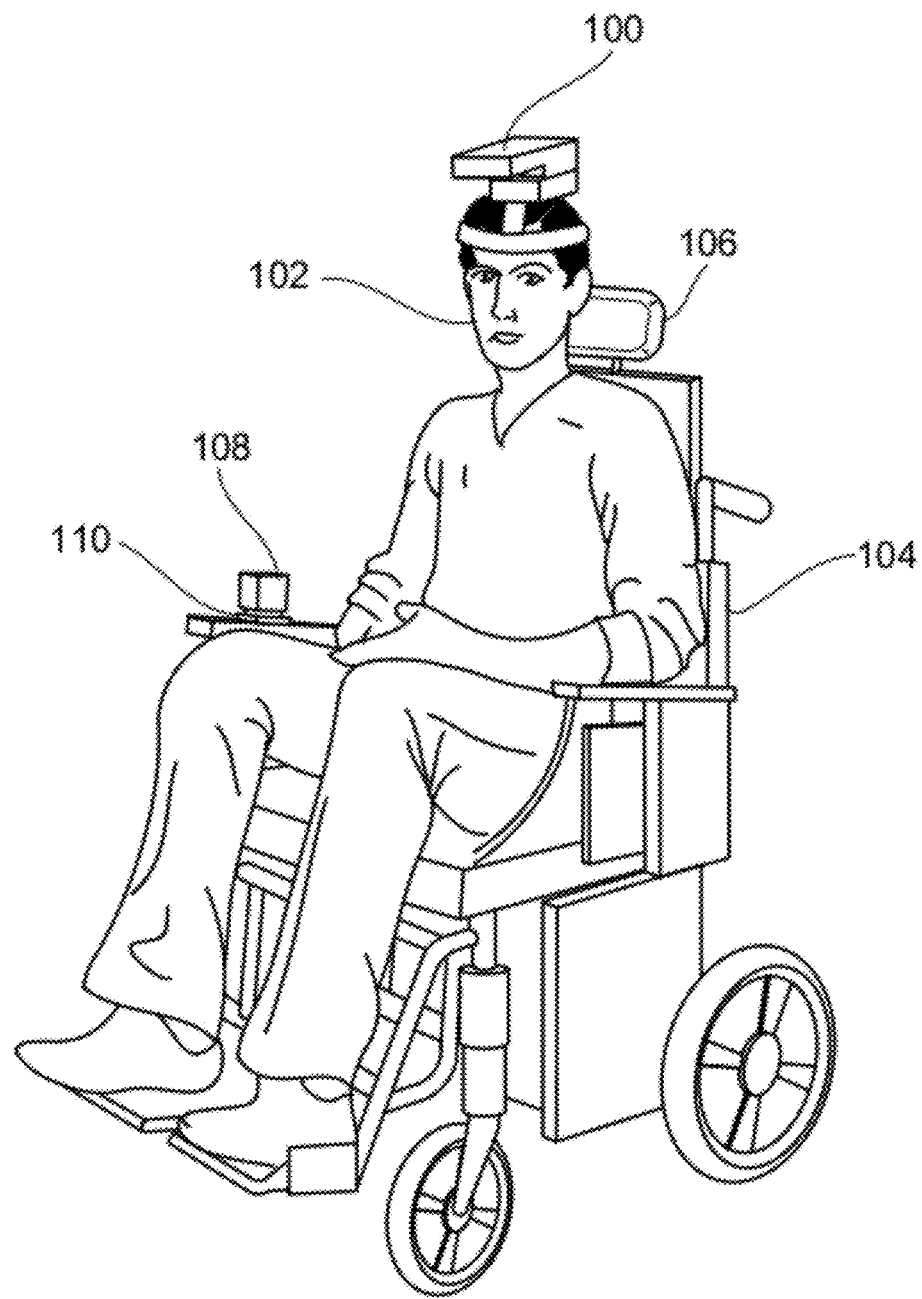
FIG. 1 is a head-guided wheelchair.

FIG. 1 shows a head-mounted controller 100 on the head 102 of a disabled person 104. The disabled person 104 moves the head 102 to control movement of a motorized wheelchair 106 using the head-mounted controller 100. The head-mounted controller 100 is in communication with a wheelchair-mounted interface 108 that attaches to a wheelchair control 110. The wheelchair-mounted interface 108 can be attached to and detached from the wheelchair control 110 and the motorized wheelchair 106 and used with other wheelchairs if desired. In some implementations, the wheelchair control 110 is a joystick that, under other circumstances, a wheelchair operator would control with hands. In some implementations, the wheelchair control 110 is a set of buttons or another kind of hand or finger control. The wheelchair control can also be another kind of control adapted for use by something other than hands or fingers.

In some implementations, the head-mounted controller 100 communicates with the wheelchair-mounted interface 108 over a wireless communication medium. In some examples, the head-mounted controller 100 and wheelchair-mounted interface 108 use Bluetooth transceivers and communicate using a Bluetooth communications protocol, or the head-mounted controller 100 and wheelchair-mounted interface 108 may have other kinds of wireless transceivers and use other wireless protocols suitable for short-range communication.

Figure 2:
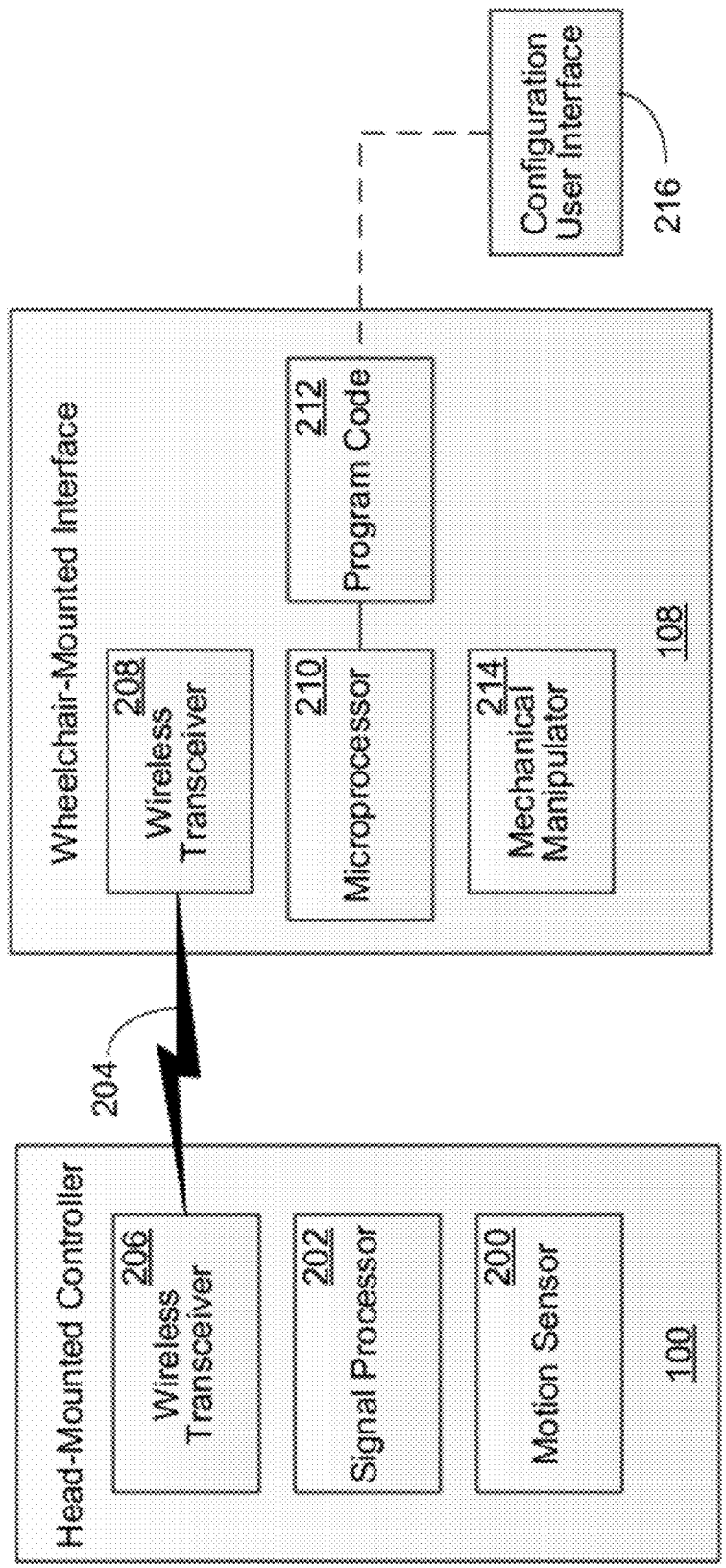
FIG. 2 is a block diagram of a head-mounted controller and a wheelchair-mounted interface.

FIG. 2 shows a block diagram of the head-mounted controller 100 and the wheelchair-mounted interface 108. The head-mounted controller 100 has a motion sensor 200 that detects movement of the disabled person's head and translates those motions into electronic signals. For example, the motion sensor 200 may include one or more accelerometers that can detect movements in x, y, and z directions. The head-mounted controller 100 uses a signal processor 202 (for example, a microprocessor, microcontroller, or application-specific integrated circuit) to convert signals from the motion sensor 200 into signals appropriate for communication over a wireless communication medium 204. For example, the motion sensor 200 may produce analog signals, and the signal processor may convert the analog signals to digital signals. In some examples, the signals may indicate the current position and orientation of the head-mounted controller. In some examples, the position and orientation are indicated as an absolute position and orientation, such as the geographical coordinates of the head-mounted controller and the cardinal direction (north, south, east, west) of the head-mounted controller relative to the Earth. In some examples, the position and orientation are indicated relative to a local point of reference, such as a neutral position and orientation of a user's head. In some examples, the signals may indicate a change in position and orientation of the head-mounted controller, such as the change in position and orientation within a time interval. In some examples, the signals may indicate a combination of these types of information, or indicate other types of information. The head-mounted controller 100 also has a wireless transceiver 206 (e.g. a Bluetooth transceiver) that sends and receives signals, using the wireless communication medium 204, to and from the wheelchair-mounted interface 108.

The wheelchair-mounted interface 108 also has a wireless transceiver 208 that sends and receives wireless signals to and from the head-mounted controller 100. In use, the wireless transceiver 208 receives signals representing motion, which it communicates to a microprocessor 210. In some examples, another type of device could be used in place of the microprocessor 210, such as a microcontroller, or application-specific integrated circuit. The microprocessor 210 is configured with program code 212 that determines how the microprocessor 210 will handle the incoming signals. Depending on the execution of the program code 212, the microprocessor 210 performs actions such as controlling a mechanical manipulator 214. The mechanical manipulator 214 is a device that directly interfaces with a control of the motorized wheelchair 106 to which the wheelchair-mounted interface 108 is attached. For example, if the motorized wheelchair 106 uses a traditional joystick, the mechanical manipulator 214 attaches to the joystick and is capable of moving the joystick in substantially the same way a human hand would. The microprocessor 210 activates components of the mechanical manipulator 214 to achieve the result of controlling the wheelchair 106. In some implementations, the program code 212 is customized to a particular user of the motorized wheelchair 106, so that the microprocessor 210 interprets the motion signals transmitted from the head-mounted controller 100 calibrated to the motion characteristics of that particular user. In some examples, the program code 212 may be configurable using a configuration user interface 216 external to the wheelchair-mounted interface 108. In these examples, the configuration user interface 216 may be a program running on a general-purpose computer that can be connected to and disconnected from the wheelchair-mounted interface 108, or the general-purpose computer may communicate with the wheelchair-mounted interface 108 through a wireless communication medium (e.g. wireless communication medium 204). In some examples, configuration user interface 216 may be part of a standalone configuration device, or the configuration user interface 216 may be integrated with the wheelchair-mounted interface 108. In some implementations, the configuration user interface 216 communicates with the head-mounted controller 100.

Figure 3C:
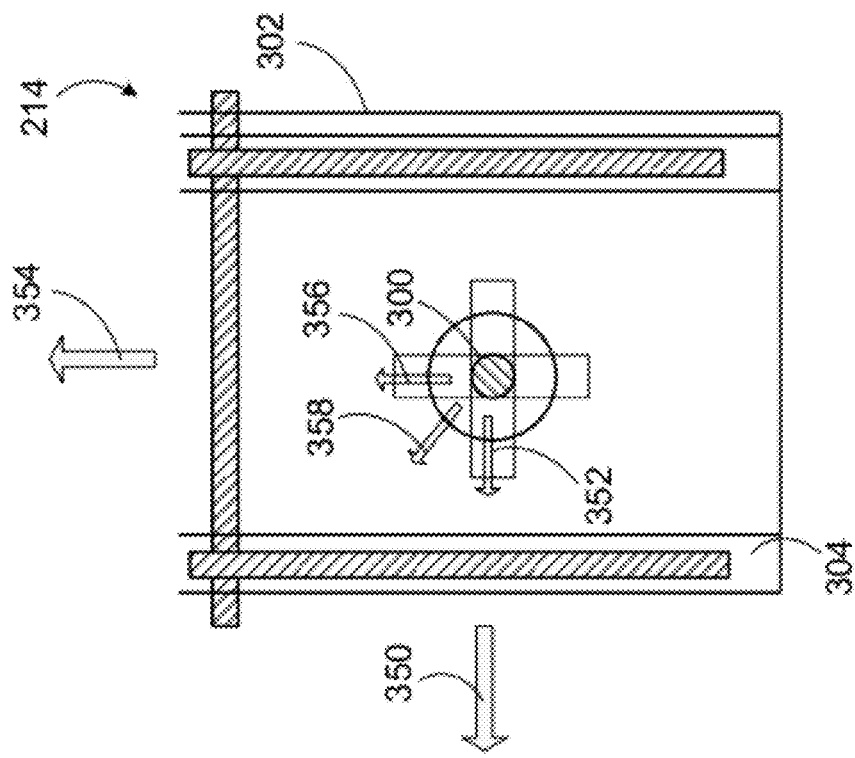
FIGS. 3A-3C show a mechanical manipulator for a head-guided wheelchair.
Figure 3A:
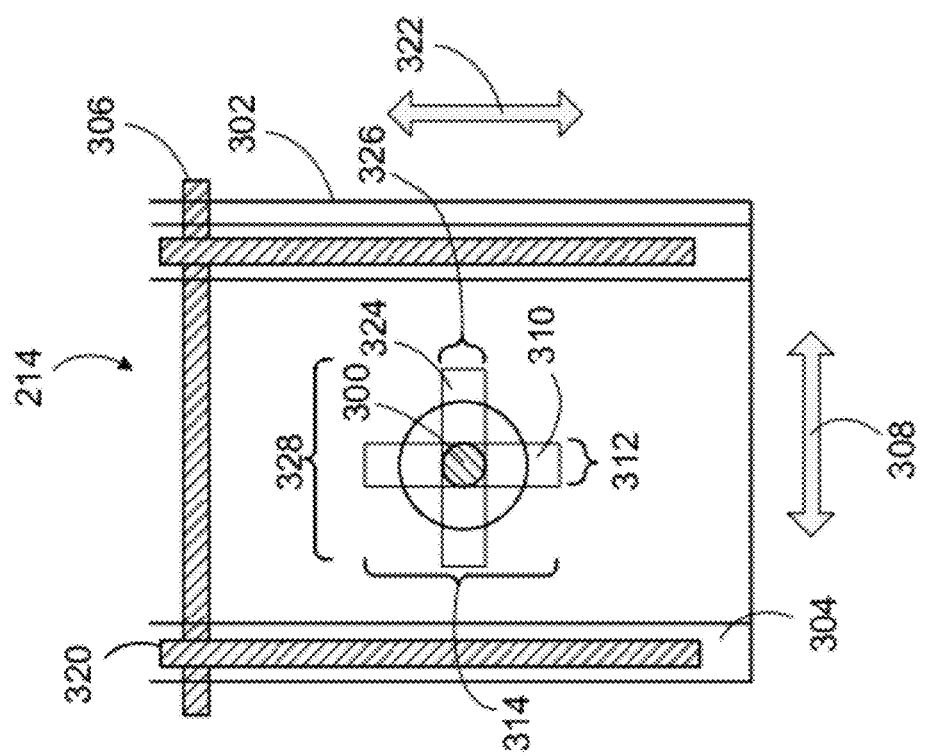

FIG. 3A shows an example of the mechanical manipulator 214 as seen from above. This version of the mechanical manipulator 214 is constructed to interface with a wheelchair control in the form of a conventional joystick 300 and is made up of an upper sliding plate 302 and a lower sliding plate 304. The sliding plates apply force to the joystick 300 to simulate the force of a human hand upon the joystick in multiple directions of travel.

The upper sliding plate 302 has a servomechanism 306 that slides the plate along a linear direction of travel 308. The upper sliding plate 302 also has a slot 310 having a narrow dimension 312 and a wide dimension 314. The joystick 300 has a limited range of motion within the narrow dimension 312, so that motion of the upper sliding plate 302 along the linear direction of travel 308 also moves the joystick 300 along the linear direction of travel 308. The joystick 300 has a less restricted range of motion within the wide dimension 314.

The lower sliding plate 304 also has a servomechanism 320, which slides the plate along a linear direction of travel 322 perpendicular to the linear direction of travel 308 of the upper sliding plate 302. The lower sliding plate 304 also has a slot 324 having a narrow dimension 326 and a wide dimension 328. The lower sliding plate 304 is arranged so that motion along the linear direction of travel 322 also moves the joystick 300 along the linear direction of travel 322, and at the same time the joystick 300 can also move freely within the wide dimension 328 of the slot 324, for example, along the other linear direction of travel 308.

The arrangement of the upper sliding plate 302 and the lower sliding plate 304 allows either sliding plate to move the joystick 300 without interfering with the motion of the other sliding plate. For example, when the upper sliding plate 302 moves the joystick 300 along its direction of travel 308, the joystick moves freely within the wide dimension 328 of the slot 324 of the lower sliding plate 304. Similarly, when the lower sliding plate 304 moves the joystick 300 along its direction of travel 322, the joystick 300 moves freely within the wide dimension 314 of the slot 310 of the upper sliding plate 302. Thus, both sliding plates can move the joystick 300 along their respective directions of travel at the same time.

Figure 3B:
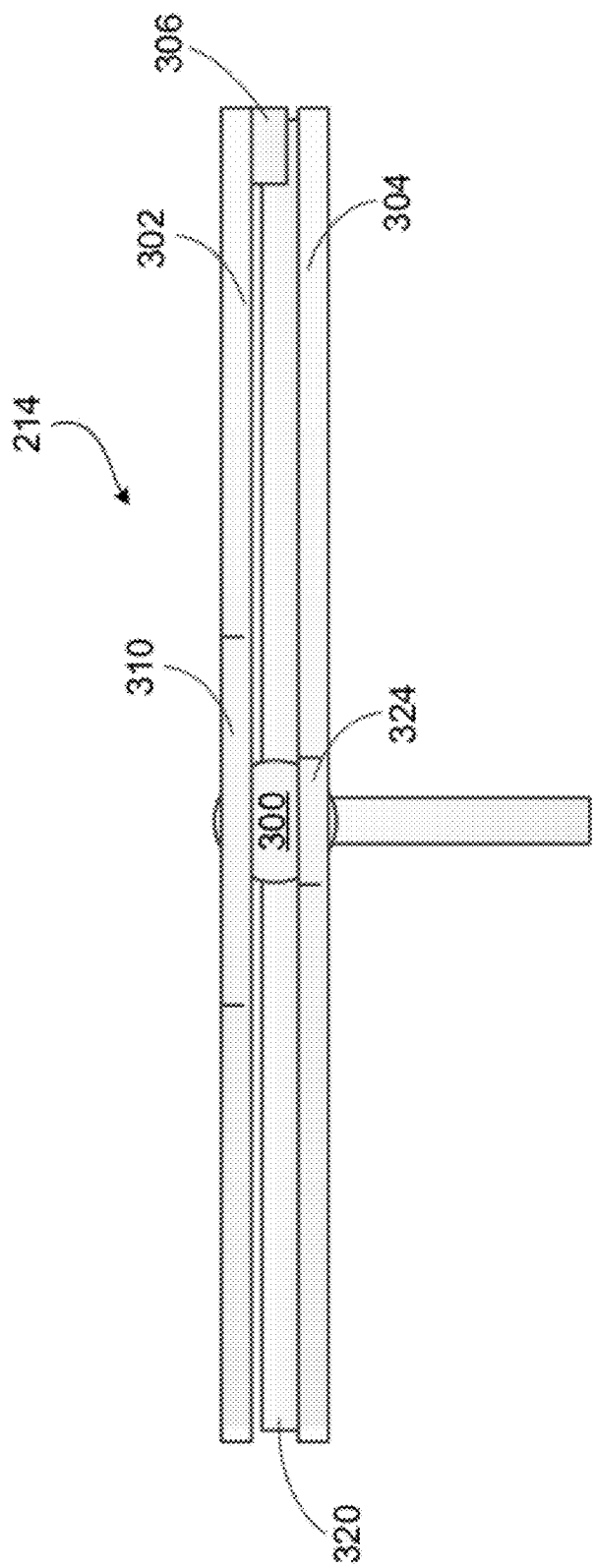

FIG. 3B shows an example of the mechanical manipulator 214 as seen from the side. The joystick 300 fits within the slot 310 of the upper sliding plate 302 and the slot 324 of the lower sliding plate 304. The upper sliding plate 302 attaches to the servomechanism 306 (shown here the side), and the lower sliding plate 304 attaches to the other servomechanism 320 (shown here behind the joystick 300).

As shown in FIG. 3C, the movement of the joystick 300 may correspond to the motion of the disabled person's head. In some examples, a head motion corresponding to leftward movement (e.g., a head nod to the disabled person's left) will cause the upper sliding plate 302 to move 350 to the left relative to the orientation of the motorized wheelchair, which moves 352 the joystick 300 to the left. A head motion corresponding to forward movement (e.g., a forward head nod) will cause the lower sliding plate 304 to move 354 forward relative to the orientation of the motorized wheelchair 106, which moves 356 the joystick 300 forward. Because the plates can move simultaneously, a diagonal head motion may translate into movements 350, 354 of both sliding plates 302, 304, causing the joystick 300 to move 358 diagonally.

Figure 4:
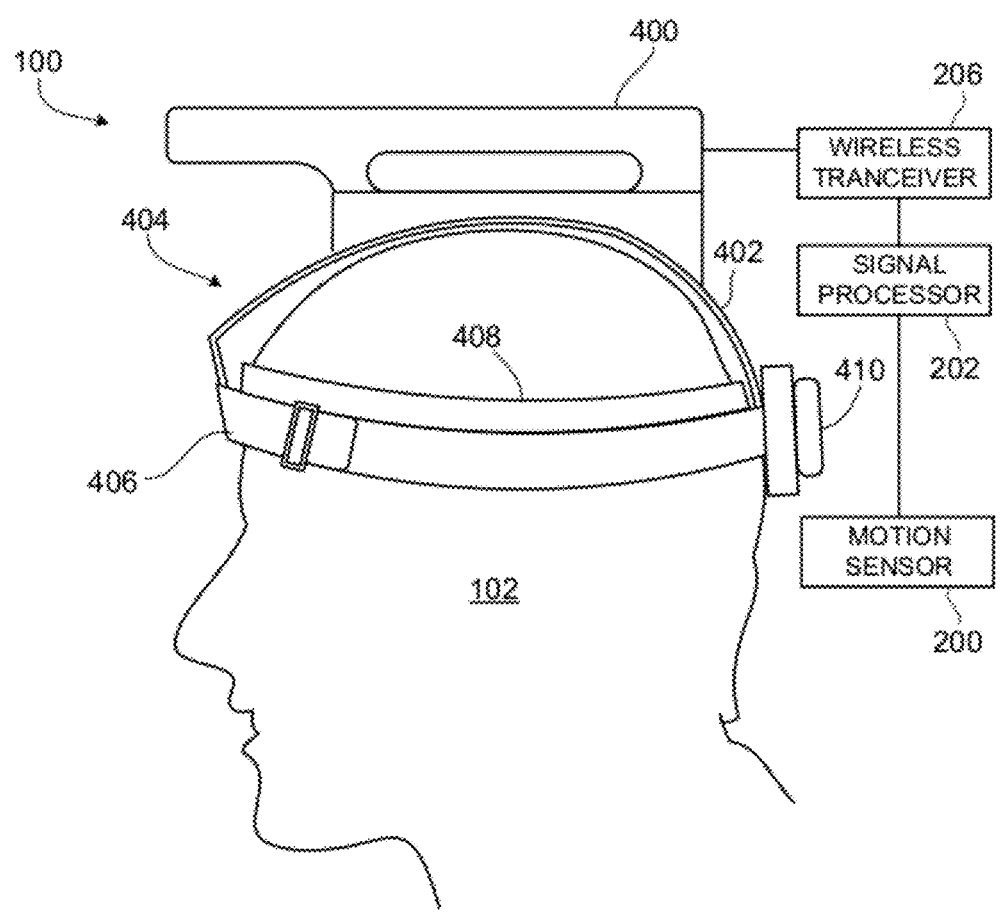
FIG. 4 shows a head-mounted controller.

FIG. 4 shows an example of the head-mounted controller 100. The head-mounted controller 100 includes an electronics package 400 attached to wearable headgear 402. The electronics package 400 contains the components necessary to sense head movement, including the motion sensor 200, signal processor 202, and wireless transceiver 206. In some implementations, the electronics package 400 may be an "off-the-shelf" commercial product incorporating the appropriate components and capable of communicating signals to and from the wheelchair-mounted interface 108 (FIG. 1).

The wearable headgear 402 fits over a head 102 of a disabled person 104 so that movements of the electronics package 400 closely correspond to movements of the head 102. The wearable headgear 402 has a support band 404 that attaches to the electronics package 400 and is curved to substantially fit the curve of the head 102. The support band 404 is flexible to accommodate different head shapes and sizes. The support band 404 is attached to a headband 406, which fits around the circumference 408 of the head 102. The headband 406 can be adjusted (e.g. by the disabled person's companion or caretaker) to be larger or smaller to fit snugly around the circumference 408 of the head 102. For example, the headband 406 can have a knob 410 that loosens the headband when turned in one direction and tightens the headband 406 when turned in another direction. In some implementations, the headband 406 may have straps or padding to provide additional adjustment options.

FIGS. 5A through 5F are diagrams of head motions that the disabled person 104 can use to control the motorized wheelchair 106 using the head-mounted controller 100. In general, the head motions for controlling the wheelchair 106 are dual-action, such that the disabled person 104 moves the head 102 from a centered resting position to an off-center position, and then back to the centered resting position, in order to control the wheelchair 106 to perform a certain action. The disabled person 104 thus does not have to place the head 102 in an off-center position for more than a brief moment, minimizing the potential for discomfort. The completion of the dual-action movement results in a change in wheelchair velocity (e.g. speed and/or direction).

As shown in FIG. 5A, the disabled person 104 (as seen from the back) positions the head to the left 502 and then back to the resting position to turn the motorized wheelchair 106 to the left. In some implementations, each completion of this motion changes the direction of the motorized wheelchair 106 by a fixed amount, e.g., directs the motorized wheelchair 106 ten degrees to the left.

FIG. 5B shows the resting position 504 as seen from the back.

As shown in FIG. 5C, the disabled person 104 (as seen from the back) positions the head to the right 506 and then back to the resting position to turn the motorized wheelchair 106 to the right. In some implementations, each completion of this motion changes the direction of the motorized wheelchair 106 by a fixed amount, e.g., directs the motorized wheelchair 106 ten degrees to the right.

As shown in FIG. 5D, the disabled person 104 (as seen from the right side) positions the head backward 508 and then back to the resting position to initiate backward motion of the motorized wheelchair 106. If the present velocity of the motorized wheelchair 106 is already in the backward direction, this motion increases the speed of the wheelchair. If the present velocity of the motorized wheelchair 106 is in the forward direction, this motion slows the wheelchair. In some implementations, each completion of this motion changes the speed of the motorized wheelchair 106 by a fixed amount, e.g., causes the motorized wheelchair 106 to change its speed by one mile per hour.

FIG. 5E shows the resting position 504 as seen from the right side.

As shown in FIG. 5F, the disabled person 104 (as seen from the right side) positions the head forward 510 and then back to the resting position to initiate forward motion of the motorized wheelchair 106. If the present velocity of the motorized wheelchair 106 is already in the forward direction, this motion increases the speed of the wheelchair. If the present velocity of the motorized wheelchair 106 is in the backward direction, this motion slows the wheelchair. In some implementations, each completion of this motion changes the speed of the motorized wheelchair 106 by a fixed amount, e.g., causes the motorized wheelchair 106 to change its speed by one mile per hour.

In some implementations, head motions can be used to enable or disable control of the motorized wheelchair 106. For example, the disabled person 104 can perform a particular sequence of head motions to deactivate the motorized wheelchair 106 and can perform the same sequence or a different sequence of head motions to activate the motorized wheelchair 106. The head motions can be different than the individual head motions shown in FIG. 5A-5E so that the deactivation sequence does not cause the motorized wheelchair 106 to perform undesired movements. In some implementations, the motorized wheelchair 106 deactivates automatically after a period in which the disabled person 104 does not perform any head motions. In some implementations, the wheelchair-mounted interface 108 has an enable/disable switch so that a person other than the disabled person 104 (for example, the disabled person's companion or caretaker) can use the switch to temporarily activate or deactivate the movement of the motorized wheelchair.

The motorized wheelchair 106 may have a built-in safety mechanism such that the speed of the wheelchair 106 does not exceed a safety limit, for example, if the disabled person 104 keeps nodding forward. The head-mounted controller 100 and wheelchair-mounted interface 108 may also have built-in safety mechanisms. For example, the head-mounted controller 100 may be configured to operate within a particular range of motion. If the head 102 of a disabled person 104 moves beyond the allowed range of motion, the head-mounted controller 100 and/or wheelchair-mounted interface 108 will detect this event and initiate an emergency stop or other safety measure. Such an event could indicate that the head-mounted controller 100 has fallen off the head 102, for example, or that the disabled person 104 has become unconscious and his/her head 102 has entered an otherwise uncomfortable position.

Figure 6:
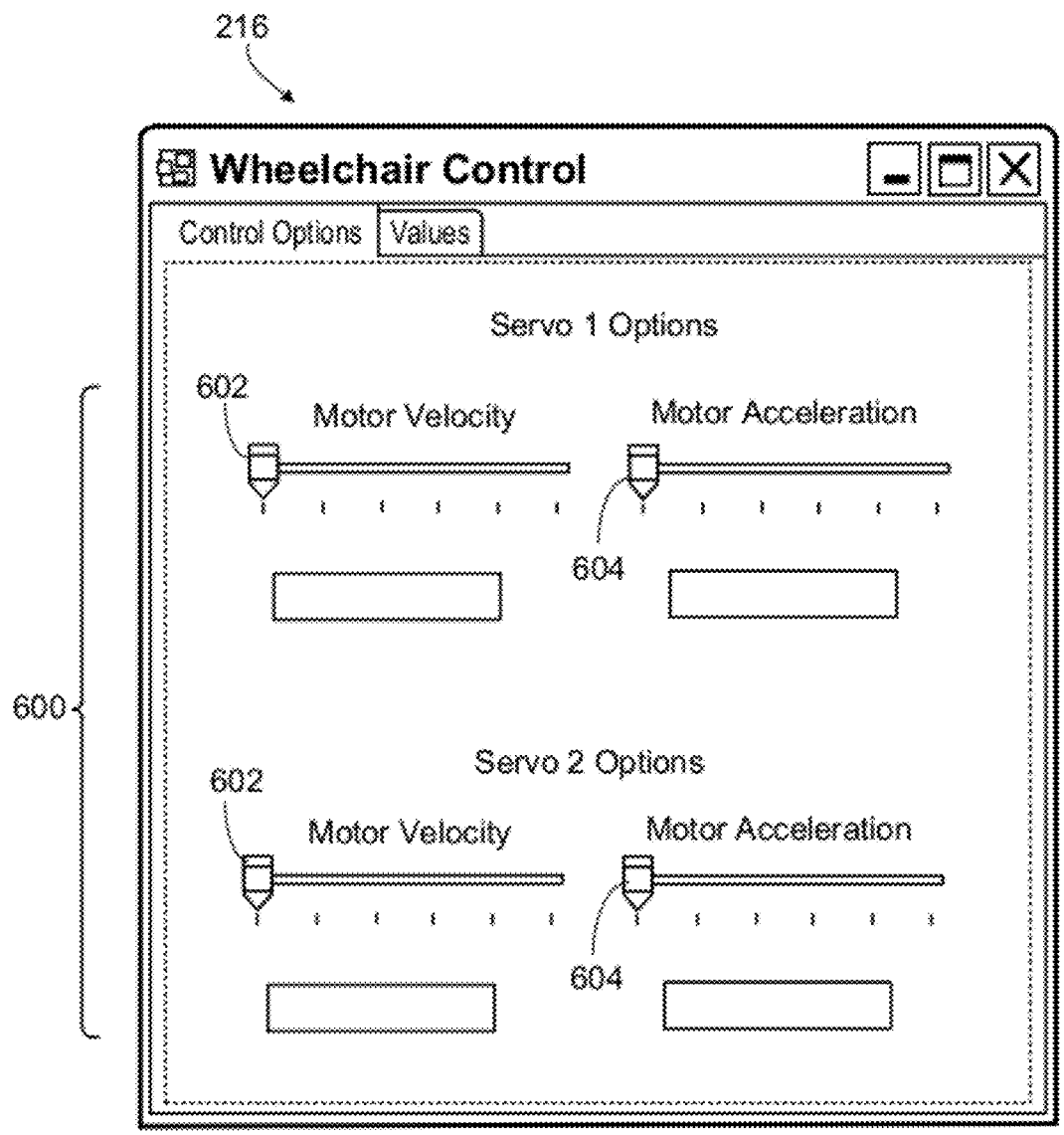
FIG. 6 shows a configuration user interface of a head-guided wheelchair control system.

FIG. 6 is an example of a configuration user interface 216 that can be used to access configuration settings of the wheelchair-mounted interface 108. For example, the configuration user interface 216 can be used to customize settings of the program code 212 to a particular user of the motorized wheelchair 106. In some implementations, the configuration user interface 216 has controls 600 for adjusting the sensitivity of the velocity 602 and acceleration 604 of the servomechanisms 306, 320 (FIG. 3). For example, one user of the head-mounted controller 100 may tend to move his head very gently or slowly. In this example, the velocity 602 and acceleration 604 of the servomechanisms 306, 320 can be adjusted to be very sensitive to head movements so that the user's movements are properly reflected in the motion of the motorized wheelchair 106. Similarly, in another example, a different user of the head-mounted controller 100 may tend to move her head very quickly or deliberately. In this example, the velocity 602 and acceleration 604 of the servomechanisms 306, 320 can be adjusted to be less sensitive to head movements so that this user's movements are properly reflected in the motion of the motorized wheelchair. In some configurations, the settings can be customized for each use of the head-mounted controller, or the settings can be saved and later retrieved.

Figure 7:
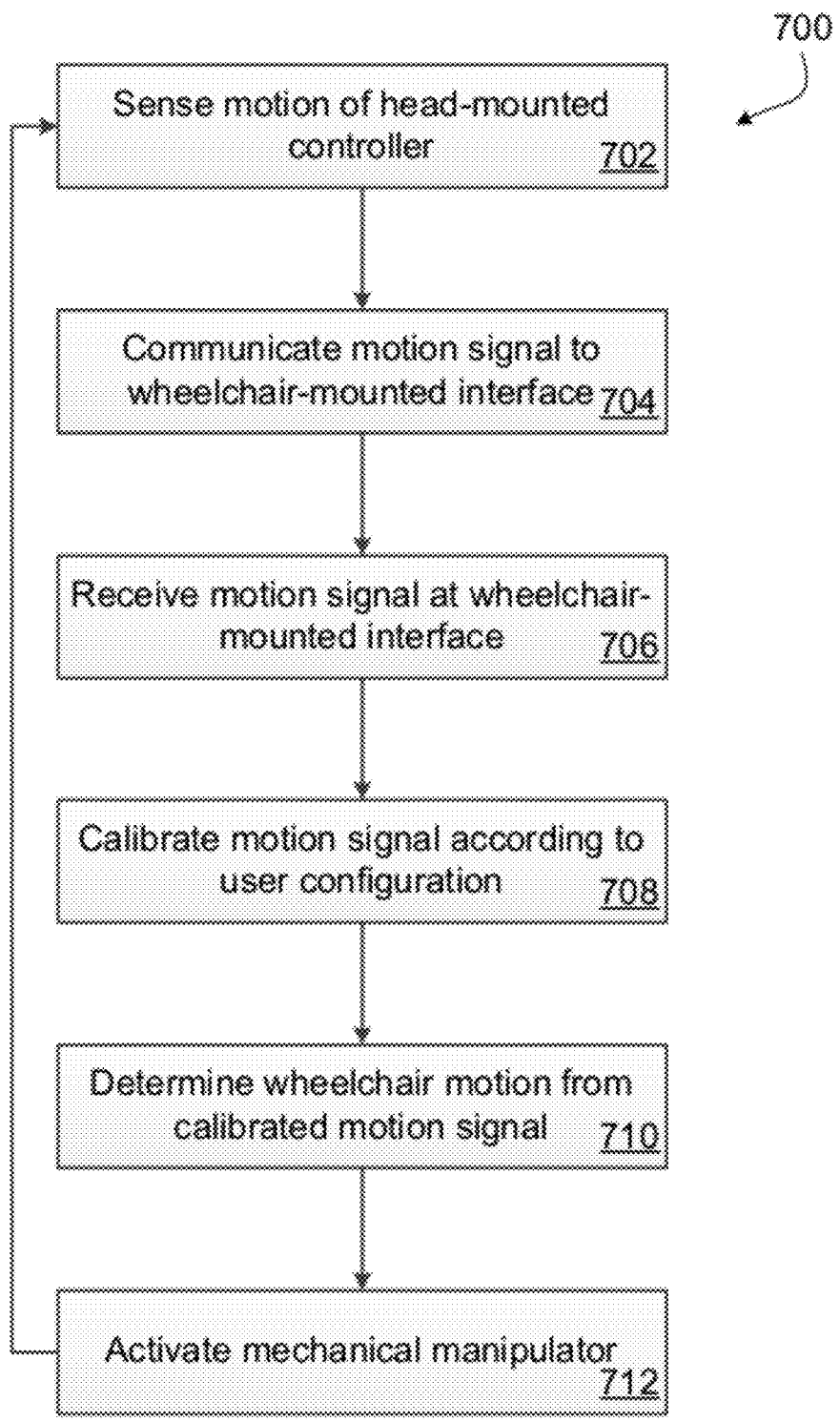
FIG. 7 is a flowchart of operations for the use of a head-mounted controller and a wheelchair-mounted interface

FIG. 7 is a flowchart 700 representing operations of the head-mounted controller 100 and the wheelchair mounted interface 108. In step 702, the head-mounted controller senses motion of a disabled person's head. In step 704, the head-mounted controller communicates a motion signal to the wheelchair-mounted interface, e.g., over a wireless communication medium. In step 706, the wheelchair-mounted interface receives the motion signal. In step 708, the wheelchair-mounted interface calibrates the motion signal according to user configuration settings so that the motion of the disabled person's head corresponds to the appropriate motion of the wheelchair, if any. In step 710, the wheelchair-mounted interface determines the motion of the wheelchair by converting the calibrated motion signal into signals that cause movements of the mechanical manipulator, including activation of the servomechanisms. In step 712, the wheelchair-mounted interface activates the mechanical manipulator to change the velocity of the motorized wheelchair. The head-mounted controller 100 and the wheelchair mounted interface 108 then return to step 702 to process further head movements.

In some implementation, the steps may be performed in a different order. For example, the motion signals from the head-mounted controller may be converted to signals that cause movements of the mechanical manipulator before the signals are calibrated according to user configuration settings.

Although the system is described as usable by a disabled person, this is only an example of use. The system could also be used by an able-bodied person to control a motorized wheelchair or another kind of vehicle in which head-motion control is useful or desirable.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and/or the apparatus can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of embodiments of the invention have been described. Nevertheless, it will be understood that various modifications may be made without departing from the spirit and scope of the invention. For example, some of the steps described above may be order independent, and thus can be performed in an order different from that described. The electronics package 400 can be, e.g., a smart phone having motion sensors that can sense the orientation and movements of the phone. An application program can be executed on the smart phone to process the sensor signals and generate wheelchair control signals that are transmitted wirelessly (e.g., using the Bluetooth communications protocol) to the wheelchair-mounted interface 108. In some implementations, the motorized wheelchair 106 has a wheelchair control that can directly receive Bluetooth signals to control movements of the wheelchair. In this example, the joystick 300 of the motorized wheelchair 106 is optional or absent, and it would not be necessary to use the mechanical manipulator 214.

The material in this application is related to U.S. Provisional Application 61/221,039, which is hereby incorporated by reference in its entirety.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. An apparatus comprising:
   a wheelchair control device sensitive to motion and adaptable to attached to a user's head; and
   a wheelchair interface device in communication with the wheelchair control device and adapted to manipulate a control system of a motorized wheelchair in response to communication from the wheelchair control device.

2. The apparatus of claim 1 wherein the control system of the motorized wheelchair comprises a hand control.

3. The apparatus of claim 2 wherein the hand control comprises a joystick.

4. The apparatus of claim 1 wherein the wheelchair control device comprises at least one configuration option customizable for an individual user of the wheelchair control device.

5. The apparatus of claim 4 wherein the configuration option comprises calibration of sensitivity to motion of the wheelchair control device according to movement patterns.

6. The apparatus of claim 4 further comprising a configuration user interface for configuring the at least one configuration option, wherein the configuration user interface is in communication with at least one of the wheelchair control device and the wheelchair interface device.

7. The apparatus of claim 1 further comprising a microprocessor configured to process movement signals of the wheelchair control device and communicate movement signals to the wheelchair interface device.

8. The apparatus of claim 1 wherein the wheelchair interface device is capable of attachment to and detachment from to the motorized wheelchair.

9. The apparatus of claim 1 wherein the wheelchair interface device is in wireless communication with the wheelchair control device.

10. The apparatus of claim 1 wherein the wheelchair control device comprises an accelerometer.

11. The apparatus of claim 1 wherein the wheelchair interface device comprises at least one sliding plate and at least one servomechanism.

12. A method comprising
    detecting a change in position of a head-mounted wheelchair control device, and
    causing a motorized wheelchair to change velocity in response to the detection of the change in position of the head-mounted wheelchair control device.

13. The method of claim 12 wherein causing a motorized wheelchair to change velocity comprises causing the motorized wheelchair to change direction.

14. The method of claim 12 wherein causing a motorized wheelchair to change velocity comprises causing the motorized wheelchair to change speed.

15. The method of claim 12 wherein changing the position of the head-mounted wheelchair control device comprises a head nodding action.

16. The method of claim 12 wherein changing the position of a head-mounted wheelchair control device comprises moving a user's head to a position outside a range of motion, and causing the motorized wheelchair to change velocity comprises stopping the wheelchair.

17. The method of claim 12 wherein causing the motorized wheelchair to change velocity comprises at least one of causing the motorized wheelchair to move forward, causing the motorized wheelchair to move backwards, causing the motorized wheelchair to turn left, causing the motorized wheelchair to turn right, and causing the motorized wheelchair to turn diagonally.

18. The method of claim 12 wherein causing a motorized wheelchair to change velocity comprises manipulating a control system of the motorized wheelchair.

19. The method of claim 12 further comprising causing the motorized wheelchair to activate in response to changing a position of the head-mounted wheelchair control device.

20. The method of claim 12 further comprising causing the motorized wheelchair to deactivate in response to a period of inactivity of the head-mounted wheelchair control device.

* * * * *